United States Patent
Ochs

(10) Patent No.: US 6,390,630 B1
(45) Date of Patent: May 21, 2002

(54) OUTSIDE REAR VIEW MIRROR FOR A MOTOR VEHICLE

(75) Inventor: Lothar Ochs, Koenigsfeld (DE)

(73) Assignee: Bühler Motor GmbH, Nurnberg (DE)

( * ) Notice: Subject to any disclaimer, the term of this patent is extended or adjusted under 35 U.S.C. 154(b) by 0 days.

(21) Appl. No.: 09/794,233

(22) Filed: Feb. 28, 2001

(30) Foreign Application Priority Data

Feb. 29, 2000 (DE) .......................... 100 09 670

(51) Int. Cl.⁷ .............................. G02B 5/08; G02B 7/18
(52) U.S. Cl. ...................... 359/841; 359/877; 248/478; 248/900
(58) Field of Search ................. 359/841, 872, 359/877, 876; 248/476, 477, 479, 483, 484, 549, 900, 478

(56) References Cited

U.S. PATENT DOCUMENTS

| | | | | |
|---|---|---|---|---|
| 4,982,926 A | * | 1/1991 | Mori et al. | 248/479 |
| 5,867,328 A | * | 2/1999 | Stapp et al. | 359/841 |
| 6,022,113 A | * | 2/2000 | Stolpe et al. | 359/841 |
| 6,322,221 B1 | * | 11/2001 | van de Loo | 359/841 |

* cited by examiner

Primary Examiner—Mark A. Robinson
(74) Attorney, Agent, or Firm—Jacobson Holman, PLLC

(57) ABSTRACT

An outside rear view mirror for a motor vehicle, with a mirror foot to be fixed to the motor vehicle and a mirror head, whereby the mirror head, which carries a mirror glass, can be swivelled around a swivel axis relative to the mirror foot between a driving position (F) and a park position (P) by a drive, and is fixed to the mirror foot with a swivel joint, can be folded against the motor vehicle from an operating position (F to P) under a force acting externally on the mirror head, whereby a cooperation between parts fixed to the mirror foot and mirror head can be disengaged in order to avoid damage to the drive. The outside rear view mirror has a rapid synchronization of the cooperation between parts when the mirror has been folded manually. A stopper is provided on the mirror head and a counter-stopper on the mirror foot, the stopper can be stopped at the counter-stopper in the driving position (F) or in the vicinity of the driving position in the swivel direction when the cooperating parts are in a disengaged state, and the stopper can not be stopped with the counter-stopper in any swivel position between the driving position (F) and the park position (P) when the cooperating parts are in the engaged state.

35 Claims, 8 Drawing Sheets

OUTSIDE REAR VIEW MIRROR FOR A MOTOR VEHICLE

FIELD OF THE INVENTION

The invention relates to an outside rear view mirror.

BACKGROUND OF THE INVENTION

Such an outside rear view mirror is known from DE-OS 198 33 672 A1. In the known outside rear view mirror, both a power-driven displacement and a manual folding of the mirror are possible. During the manual folding in and against the direction of travel, a toothed gear disengages from the holding means on the mirror foot, whereby the mirror head is shifted relative to the mirror foot along the swivel axis. In the disengaged state, there is no longer a positive engagement connection between the toothed gear and the mirror foot, but instead a frictional engagement, which is sufficient to swivel the mirror head relative to the mirror foot by the power drive. If the outside rear view mirror is to be moved back into its starting position by the power drive, the holding means must be synchronized. This can only happen when the mirror head meets an obstacle. The folding path limiter represents this obstacle. The mirror head must therefore first be moved into the park position, where the mirror meets the folding path limiter. Only in this stop position can the toothed gear be twisted relative to the mirror foot and thus be synchronized. Only then can the mirror head be swivelled back into the driving position. This procedure takes a relatively long time, and may possibly be misunderstood by the user.

SUMMARY OF THE INVENTION

Thus the object of the present invention is to design an outside rear view mirror so that a rapid synchronization of the holding means is possible when the mirror is folded manually, without unnecessary swivel movements.

This object is achieved, according to the invention, when the mirror head is folded manually, the drive is actuated in order to swivel the mirror head back into the driving position. An obstacle has been created by the stopper and counter-stopper, which obstacle acts in the driving position and not only at the folding path limiter. When the drive is actuated, the mirror head stops its swivel movement at this obstacle, whereby the holding means are again synchronized until they again engage. It is therefore only necessary to displace the mirror electrically from the folded position into the driving position. Because of the short displacement paths, the entire procedure can be accomplished relatively quickly. Since the stops in the driving position only act in a raised position, they do not hinder the use of the mirror or its folding function.

The simplest construction is achieved by arranging the holding means in the mirror foot and on a toothed gear associated with the drive. In normal operation, the toothed gear is then a quasi component of the mirror foot.

It has proved good to construct the holding means in the form of holding cams and holding recesses whose flanks are inclined. These are simple to manufacture and the force required to disengage them can be defined by the selection of the angle of inclination.

A further influence on the force required to disengage them is exerted by a spring with which the toothed gear is held on the mirror foot. The toothed gear is preferably arranged thereby between the mirror foot and mirror head, co-axially with the swivel axis, whereby it meshes with the gear of the drive.

In the disengaged state, the toothed gear and the mirror head are raised relative to the mirror foot, by which means the is disengaged state can be recognized simply electronically via a touch contact. Furthermore this makes it possible to construct the stopper in a simple manner so that it can act only in the manually folded state.

The stopper and the counter-stopper can be arranged opposite one another in the driving position. As a result, the disengagement procedure is not hindered as a rule, in particular because the holding means on the toothed gear and the mirror foot are not constructed in the form of steps as a rule, so that a swivel movement is also performed during the disengagement procedure.

It is preferred to construct the stoppers and counter-stoppers with inclined stopper faces so that the engagement procedure can be performed in a sliding manner. This is further promoted if the angle of inclination of the stopper faces corresponds to the angles of inclination of the holding recesses and holding cams.

It is possible for the holding means also to disengage during a manual folding movement against the direction of travel; it is then important that the stoppers and counter-stoppers do not stand in the way of this disengaging movement, in order to prevent damage to the drive or the mirror. It is therefore provided that in the engaged state of the holding means, the smallest distance between the stopper and the counter-stopper in the axial direction is less than the maximum lift that the mirror head performs versus the mirror foot as it disengages. It is further provided that in the engaged state of the holding means, the smallest distance between the stopper and the counter-stopper in the axial direction is greater than the width of the stopper or the width of the counter-stopper respectively in the swivel direction on the side opposite to the counter-stopper or the stopper, respectively.

In order to prevent damage to the drive or the mirror by the stoppers and counter-stoppers, the stoppers and/or counter-stoppers can also be constructed with predetermined breaking points or as flexible components. There is then only a danger of damage if the mirror is in an intermediate position between the driving and park position and an external force acts on the mirror head.

In order to achieve a more uniform distribution of the occurring forces, several stoppers are provided, preferably two.

A very simple construction of the stoppers or counter-stoppers is achieved in that the counter-stopper on the mirror foot is formed by a washer holding down the pressure spring, which washer is fixed to a link pipe forming part of the swivel joint so that it is unable to twist. It is particularly suitable to construct the washer in the shape of a pot, whereby the counter-stoppers are arranged at the edge of the pot.

Another possible method for preventing damage to the drive or the mirror during manual folding consists in that a friction coupling is arranged between the mirror foot and the toothed gear, whereby the friction coupling only becomes active when the mirror is being folded manually against the direction of travel. In the direction of travel, stops are provided between the mirror head and the mirror foot that allow the drive to twist in a manner that is free from play, in order to minimize vibrations of the mirror. These stops are inclined towards the swivel direction, in order to enable an "over-engagement".

It is preferred that the toothed gear be connected flat via at least one friction face to a holding ring provided with the holding means, essentially annular, and arranged co-axially with the swivel axis, whereby the holding ring is arranged between the toothed gear and the mirror foot and the holding means on the holding ring and the mirror foot are shaped so that the disengaging moment is considerably smaller when an external force ($F_{IF}$) acts in the direction of travel than when an external force ($F_{GF}$) acts against the direction of travel, and the friction moment between the toothed gear and the holding ring is greater than the disengaging moment between the holding ring and the mirror foot when an external force ($F_{IF}$) acts in the direction of travel, but smaller than the disengaging moment between the holding ring and the mirror foot when an external force ($F_{GF}$) acts against the direction of travel. Due to the high friction force between the toothed gear and the holding ring, the outside rear view mirror with a power drive behaves like the previously known outside rear view mirror. When an external force ($F_{IF}$) acts on the mirror head in the direction of travel, the holding means of the holding ring connected by friction to the toothed gear disengage from the holding means of the mirror foot, because the holding means are shaped so that they can disengage in this direction, whereby the frictional force is greater than the disengaging force in the direction of travel. During disengagement from the holding means, the driving path limiter between the mirror head and mirror foot, which can not be overcome by the power drive, is also overcome. The folded mirror head can then be brought back into the driving position by the power drive.

When an external force ($F_{GF}$) acts on the mirror head against the direction of travel, the holding ring connected to the toothed gear by friction does not disengage from the holding means of the mirror foot, because the holding means are shaped so that they jam in this direction. For this reason the frictional force between the toothed gear and the holding ring can be overcome by the external force, until the driving or folding path limiter is reached. Then the mirror can be brought back into the driving position by the power drive, without the necessity for initiating a synchronization procedure between the holding means on the holding ring and the holding means on the mirror foot, since the co-ordination between the holding ring and the mirror foot is maintained, even with this forced procedure. This reduces the time required for the return procedure and also simplifies the optionally present control for this.

In a preferred form of this embodiment, the holding means are constructed in the form of holding cams and holding recesses whose flanks are inclined differently. Because of the different inclination of the flanks, disengagement is only possible in one direction. It is unimportant thereby whether the holding recesses or the holding cams are arranged in the holding ring or in the mirror foot.

In order to enable a power-driven return of the mirror head into the driving position in all situations, it is provided that the mirror head can take up position at several height levels relative to the mirror foot, whereby a frictional connection between the toothed gear and the holding ring exists at all height levels and in all angles of rotation positions of the mirror head, which frictional connection is maintained by means of the pressure spring. The positive engagement connection between the holding ring and the toothed gear would be broken if parts of the mirror head were to sit on parts of the mirror foot in the disengaged state.

In order to prevent this, in this position, at least a small gap must be present between the mirror head and the mirror foot in the swivel axis direction.

In order to enable the mirror to be folded in the direction of travel by means of an external force, the driving path limiter between the mirror head and the mirror foot must be overcome and the mirror head must be able to take up a position relative to the mirror foot at two height levels (H, L), a low (L) and a middle (H) level. In order to reach the middle height level (H) from the low level (L), in a particularly advantageous form of this embodiment of the invention, a third height level (Z) must be overcome. It is not intended thereby that this third height level (Z) should be occupied for any length of time; rather, under the influence of an external force it is to be attained only briefly and is left again immediately. The third height level (Z) should not be attainable by the power drive either from the height level (L) or from the height level (H). This rules out the possibility that during incorrect operation of the outside rear view mirror, the holding ring could engage in the holding means of the mirror foot in a mirror position that is folded forwards in the direction of travel. This incorrect operation occurs when the folded mirror is moved by the power drive further in the direction of travel until the folding path limiter is reached. Then the toothed gear would move as though it was trying to reach the third height level (Z); since this is not possible by the power drive, the drive jams at this point. If the third height level (Z) were not present, the holding ring would engage in the holding means of the mirror foot and the mirror head would lie directly on the mirror foot under the force of the pressure spring. This would break the frictional connection between the toothed gear and the holding ring, and no further power-driven actuation would be possible.

In order to exclude the risk of the third height level (Z) being occupied for any length of time, projecting formations are provided immediately adjacent to the holding recesses. In this position the maximum moment caused by the action of an external force and acting on the mirror head is to be expected. The moment required for disengagement is so high that over a short path or in a short time, it cannot be degraded sufficiently for the mirror head to remain at the third height level (Z) for any length of time.

It is advisable for the low height level (L) to be possible only between the driving position (F) and the park position (P), which ensures that no situation is possible in which a mirror folded forwards in the direction of travel can end up in a position where it can no longer be returned by the power drive.

It is also provided that the second height level (H) is possible only in the mirror positions (K) folded forwards in the direction of travel. Thus wear of the holding means on the mirror foot is only possible during the fairly rare folding in the direction of travel by means of an external force ($F_{IF}$). In is addition, the driving path limiter hereby absorbs part of the occurring forces.

To ensure that the third height level (Z) is attained only briefly, it is necessary that the third height level (Z) be possible only between the driving position (F) and a mirror position (K) folded forwards in the direction of travel. In this position, as mentioned above, the moment required to be able to fold the mirror at all is greatest; once this moment is applied, it is scarcely possible to reduce it again sufficiently and rapidly enough for the third height level (Z) to be maintained. It is also advisable to design the projecting formation on the holding ring or on the mirror foot so that stable positioning on the third height level is impossible. If the third level were able to be attained for any length of time, it is indeed true that a power-driven displacement would continue to be possible, but an incorrect operation, as mentioned above, could lead to incorrect functioning.

It is preferable for the transition between the middle height level (H) and the third height level (Z) to be designed as a stop, whereby the stop is designed as an inclined face relative to the swivel plane. This enables the mirror to be brought back into the driving position manually also, overcoming the third height level (Z). Since the third height level (Z) is not intended to be attainable by the power drive, however, the inclination of the face of the stop is designed accordingly.

According to a preferred development of the invention, the friction area between the toothed gear and the holding ring is conical. The frictional force between the toothed gear and the holding ring is sharply increased by the cone. The frictional force can be adapted to the requirements by the selection of the angle of inclination.

BRIEF DESCRIPTION OF THE DRAWINGS

Embodiments of the invention are explained below in greater detail based on the drawings.

DETAILED DESCRIPTION OF THE PREFERRED EMBODIMENTS

Figure 1:
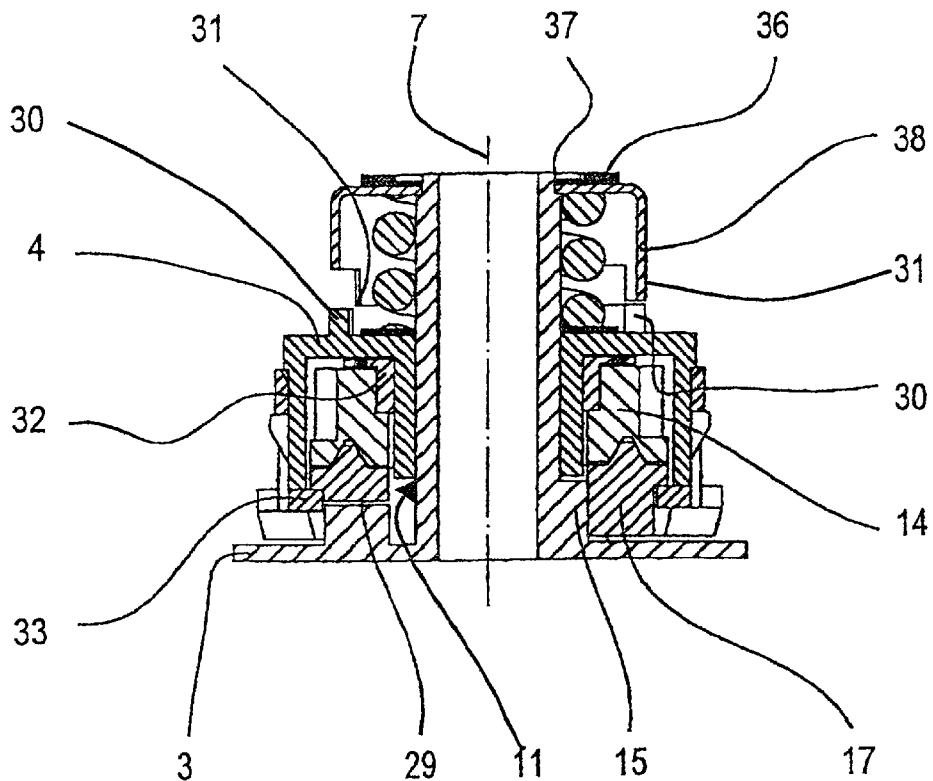
FIG. 1 shows part of a drive for a motor vehicle outside rear view mirror in section, with a stopper device.

FIG. 1 shows a part of a drive for a motor vehicle outside rear view mirror (see FIG. 10) in section, with a stopper device; this allows the per se unnecessary travels during the synchronization procedure to be omitted. In order to achieve this, only slight changes are to be made to the known outside rear view mirror. The motor vehicle outside rear view mirror consists essentially of a mirror foot 3 fixed to the vehicle body and a mirror head 4 that can swivel around a swivel axis of a swivel joint 11. Care must be taken to ensure that a stopper 30 is present in the vicinity of the driving position (see FIG. 11) that can act only when the mirror head 4 is in a raised position, in order to be able to move the outside rear view mirror also into the park position (P). FIG. 1 shows the non-raised position. The raised position is only attained by means of a force acting externally on the mirror head 4, whereby holding means between the mirror foot 3 and a toothed gear 14 disengage.

Figure 2:
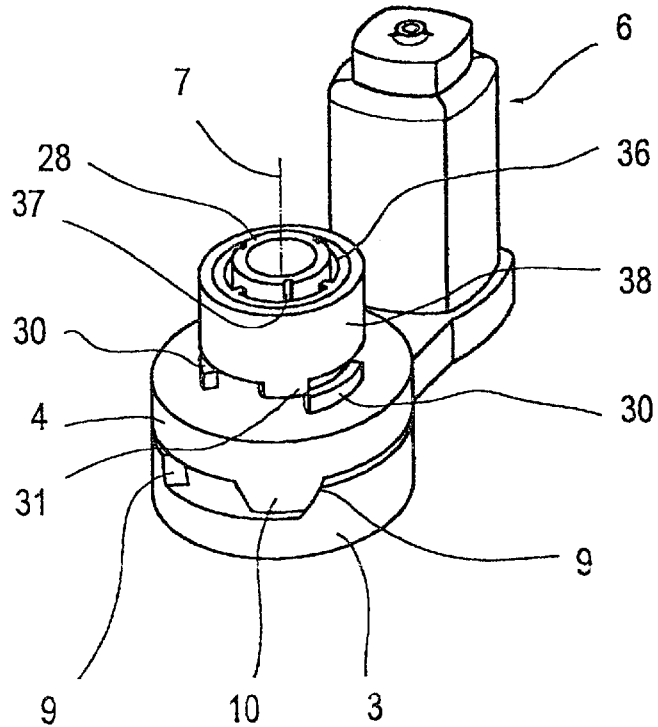
FIG. 2 shows a three-dimensional representation of the drive according to FIG. 1 with a stopper device.

A simple method of implementing this is shown in FIG. 2. The stopper 30, which is preferably one-piece with the mirror head 4, in normal operation has no possibility of coming to lie against a counter-stopper 31 fixed to the mirror foot. If the mirror head 4 is folded forwards in the direction of travel (K), however, and is raised relative to a mirror foot 3, it is possible for the stopper 30 and the counter-stopper 31 to meet. The position of the stoppers 30 and the counter-stoppers 31 is selected so that synchronization can take place in the driving position (F). In principle, however, any desired position can be selected for this. In order to implement the counter-stopper on the mirror foot, a washer 38 for holding down a pressure spring is merely shaped into a pot, on whose edge the counter-stoppers 31 are arranged. Preferably at least two stoppers 30 and at least two counter-stoppers 31 are provided.

FIG. 2 shows a three-dimensional representation of the drive 6 of the invention according to FIG. 1, with the mirror foot 3, a stop means 9, a counter-stop means 10 on the mirror head 4, the stopper 30, the pot-shaped washer 38 with the counter-stopper 31, a toothed washer 36 fixed to a link pipe 28, a toothing 37 between the pot-shaped washer 38 and the link pipe 28, by means of which the co-ordination of the stopper 30 with the counter-stopper 31 is defined. The stoppers 30 or counter-stoppers 31 can be mounted at any desired points of the mirror head or the mirror foot; a radial arrangement relative to a swivel axis 7 is also possible.

Figure 3A:
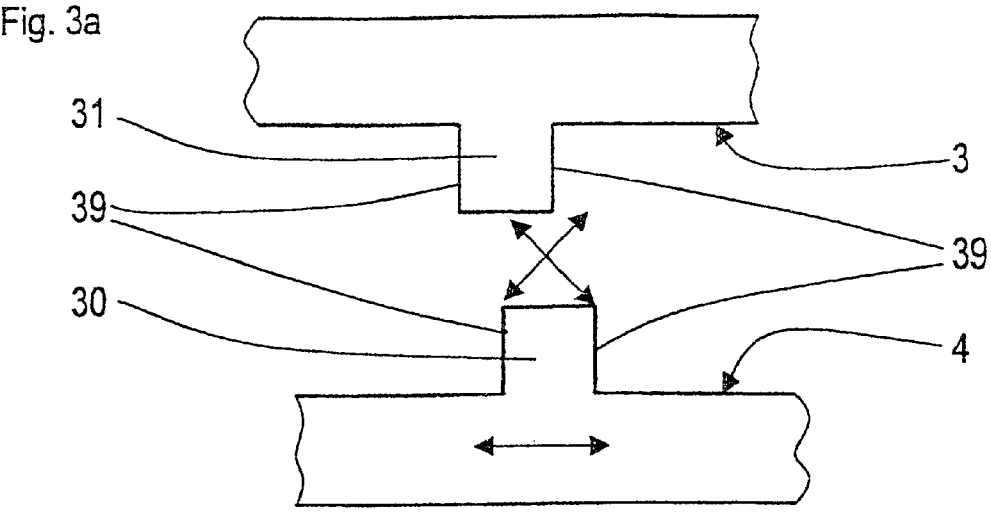
FIGS. 3a, 3b, 3c show different variants of the stopper device according to FIG. 1.

FIG. 3a shows the stopper device according to FIG. 1, with the stopper 30 and the counter-stopper 31. Here the stoppers 30 and counter-stoppers 31 are rectangular. Because the holding means and the stop means between the toothed gear 14 and the mirror foot 3 or between the mirror head 4 and mirror foot 3 are inclined, the mirror head executes a movement corresponding to the angle of inclination. Since the stoppers 30 and counter-stoppers 31 are not correspondingly inclined, a relatively large difference between the stop position and the driving position must be taken into account. Only then is a jam avoided.

Figure 3B:
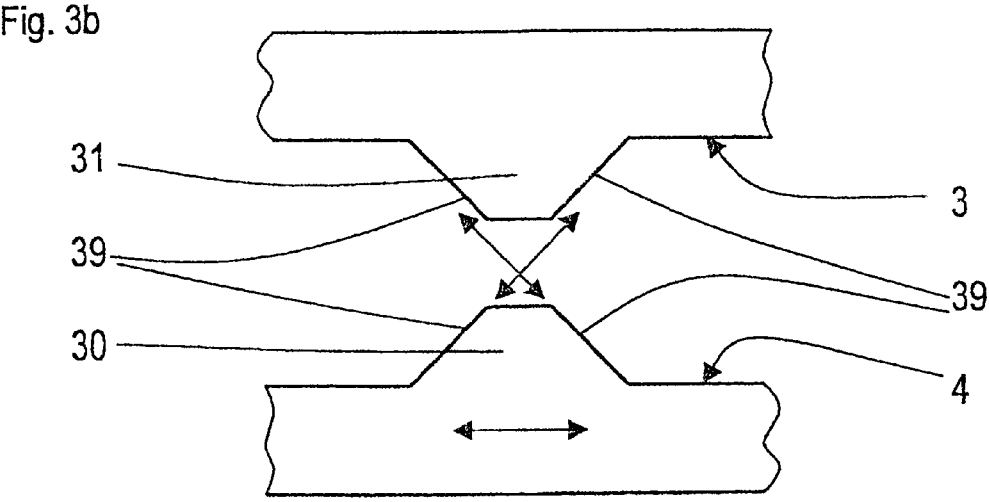

FIG. 3b shows a first variant of the stopper device according to FIG. 1, whereby the difference between the stop position and the driving position is at least reduced compared with FIG. 3a. Here the stopper faces 39 are inclined corresponding to the angles of inclination of the stop means and the holding means. As a result, a jam can only occur if the mirror was not in the driving position when it was struck externally.

Figure 3C:
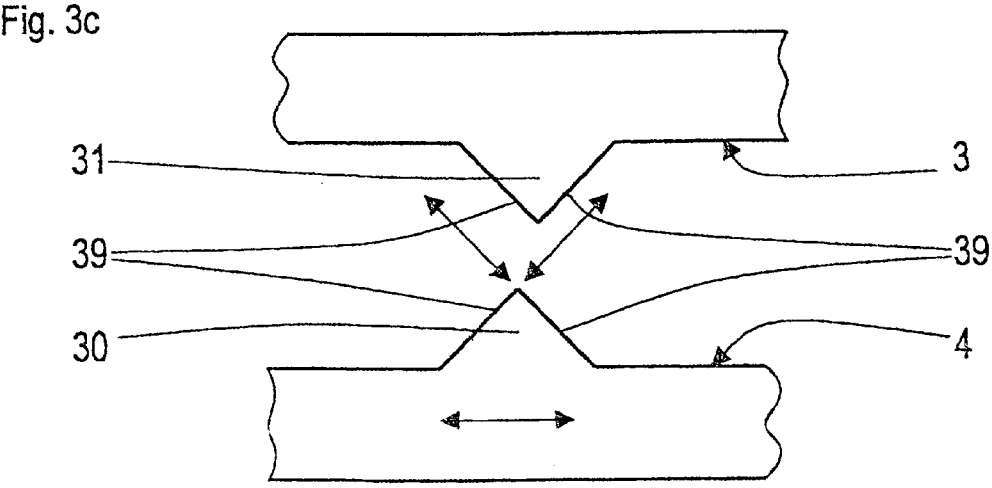

A second variant of the stopper device according to FIG. 1 is given by the tapered shape of the stoppers 30 and the counter-stoppers 31 in FIG. 3c.

Figure 4:
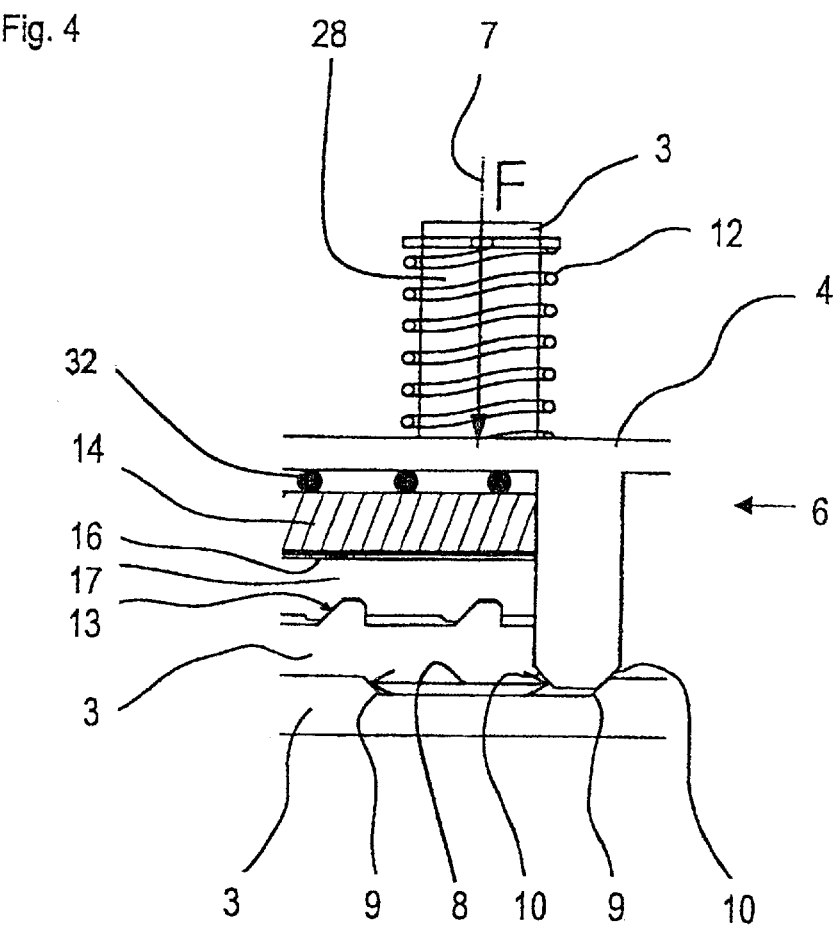
FIG. 4 shows a schematic diagram of a preferred development of the holding device of the drive in a first position (shown here without the stopper device for the sake of clarity)

FIG. 4 shows a schematic diagram of a preferred development of the holding device of the drive in a first position (shown here without the stopper device for the sake of clarity), with the mirror foot 3, the mirror head 4, a holding ring 17, the toothed gear 14, and a pressure spring 12 that exerts a force F on the components (3, 17, 14, 4) arranged on one another around the swivel axis 7 on a swivel path 8. The holding ring 17 is positively engaged with the mirror foot 3 thereby via holding means 13. The mirror head 4 lies against the mirror foot 3 via the stop means 9 and counter-stop means 10.

Figure 5:
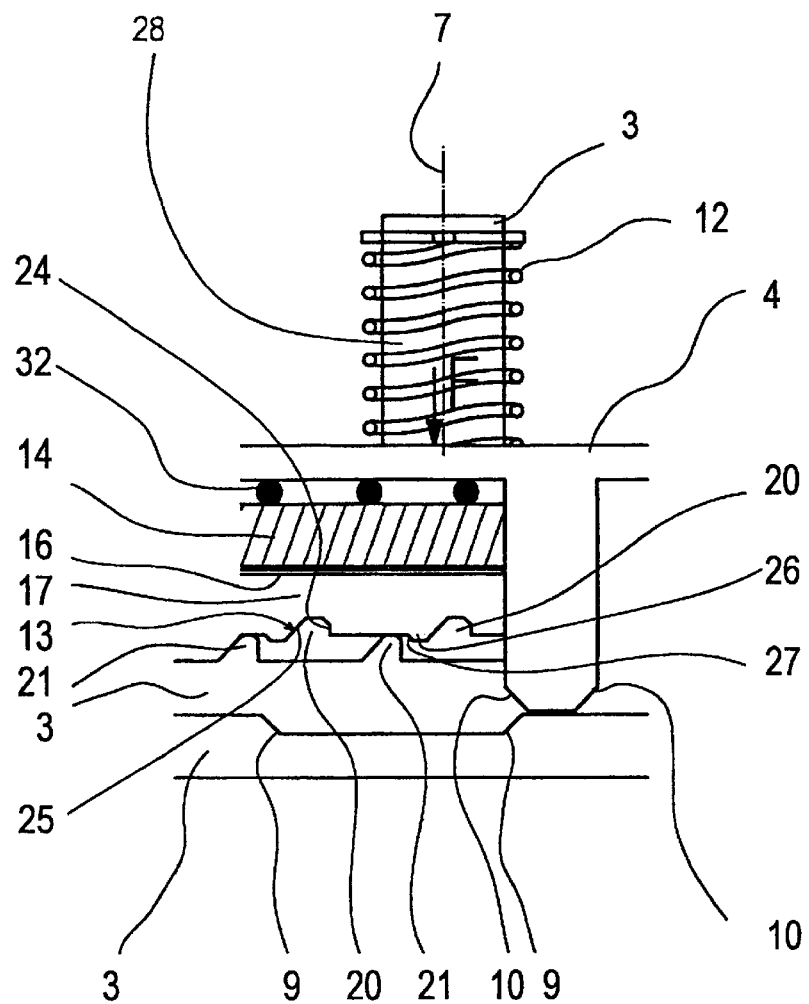
FIG. 5 shows a schematic diagram of the holding device according to FIG. 4 in a second position (shown here without the stopper device for the sake of clarity)

FIG. 5 shows a schematic diagram of the drive 6 according to FIG. 4 (shown without the stopper device for the sake of clarity) in a second position in which the holding ring 17 is disengaged from the holding means 13 and the mirror head 4 is raised relative to the mirror foot 3. The holding means 13 consist of holding cams 21 and holding recesses 20. The holding recesses 20 are provided with differing side faces, whereby the one side 24 is oriented at right angles or approximately at right angles to the displacement direction and the other side 25 is inclined towards the displacement direction, so that disengagement is possible under the influence of a sufficiently great force. A projecting formation 26 is adjacent to this second face; the width of this formation is small in the swivel direction, and on the side opposite to the holding recess 20, it has a face 27 inclined towards the displacement direction and whose inclination is selected so that because of the twisting of the holding ring 17 on the mirror foot 3, the drive is not capable of overcoming this inclined face 27 against the force of the pressure spring 12. In contrast, however, it is possible to overcome the inclined face 27 by a force acting externally on the mirror head 4. The projecting formation 26 serves as a means of preventing incorrect operation that could lead to the pressure spring 12 no longer exerting any force on a friction area 16 between the toothed gear 14 and the holding ring 17. In such a situation the rear view mirror would no longer be able to be moved by the power drive.

Figure 6:
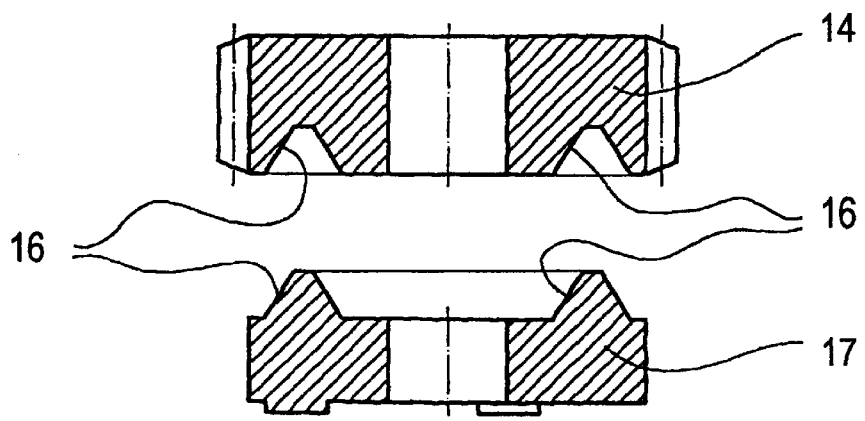
FIG. 6 shows a sectional view through a toothed gear and a holding ring according to FIG. 4.

FIG. 6 shows the friction area 16 arranged as an annular cone between the toothed gear 14 and the holding ring 17 (according to FIG. 4). The frictional force can be adjusted to the desired value by changing the angle of inclination of the annular cone.

Figure 7:
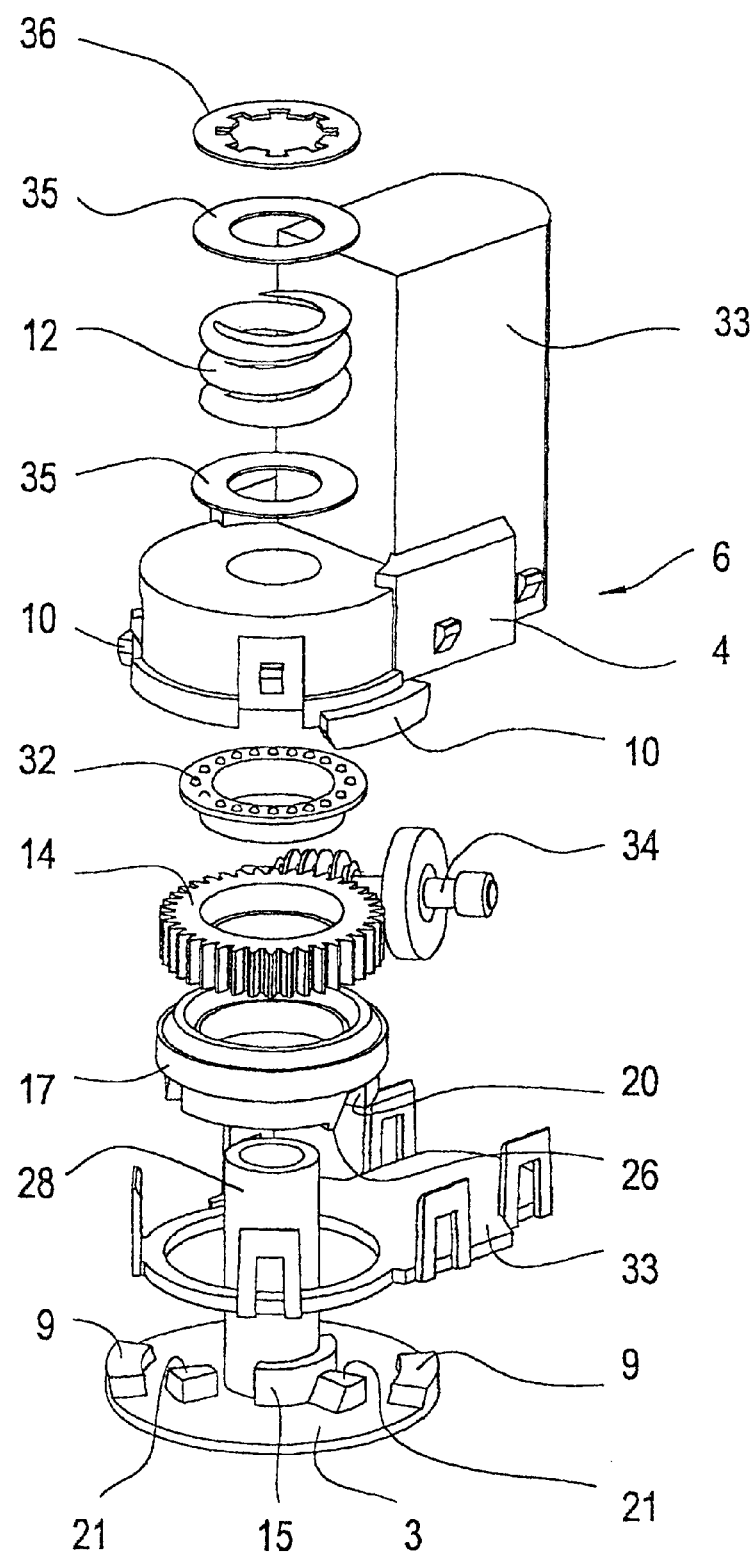
FIG. 7 shows an exploded representation of the drive according to FIG. 4 (shown here without the stopper device for the sake of clarity)

FIG. 7 shows an exploded representation of the drive according to FIG. 4 (shown here without the stopper device for the sake of clarity) with the mirror foot 3, the stops 9, the holding cams 21, the link pipe 28, a folding path limiter 15, a drive housing 33, the holding ring 17, the toothed gear 14, a step-down gear 34 that consists here of a two-stage worm gear pair and that can be driven by a subfractional horsepower electric motor, not shown, a bearing 32, the mirror head 4, whereby "mirror head" refers to those parts that are jointly moved when the mirror is swivelled, the counter-stop means 10, washers 35, the pressure spring 12, and the toothed washer 36.

Figure 8:
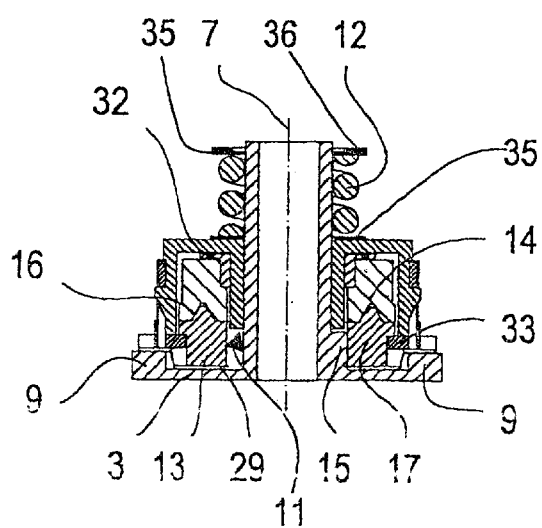
FIG. 8 shows a sectional view through a swivel axis of the drive according to FIG. 4 (shown here without the stopper device for the sake of clarity)

FIG. 8 shows a sectional view of the drive in the area of the swivel axis 7 with the mirror foot 3, the stop means 9, the holding means 13, the holding ring 17 with the friction area 16, the drive housing 33, the toothed gear 14, the bearing 32, the pressure spring 12, the washers 35 and the toothed washer 36. Between the holding ring 17 and the mirror foot 3, an air gap 29 can be seen that ensures a defined support of the holding recesses 20 of the holding ring 17 on the holding cams 21 of the mirror foot. The pressure spring 12 is supported on the one hand via the one washer 35 and the toothed washer 36 on the link pipe 28, and thus on the mirror foot 3, and on the other hand acts on the mirror head 4, the bearing 32, the toothed gear 14, and the holding ring 17 via the second washer 35 and thus ensures that the friction area 16 has a defined frictional force and the holding ring 17 is securely held on the mirror foot 3.

Figure 9:
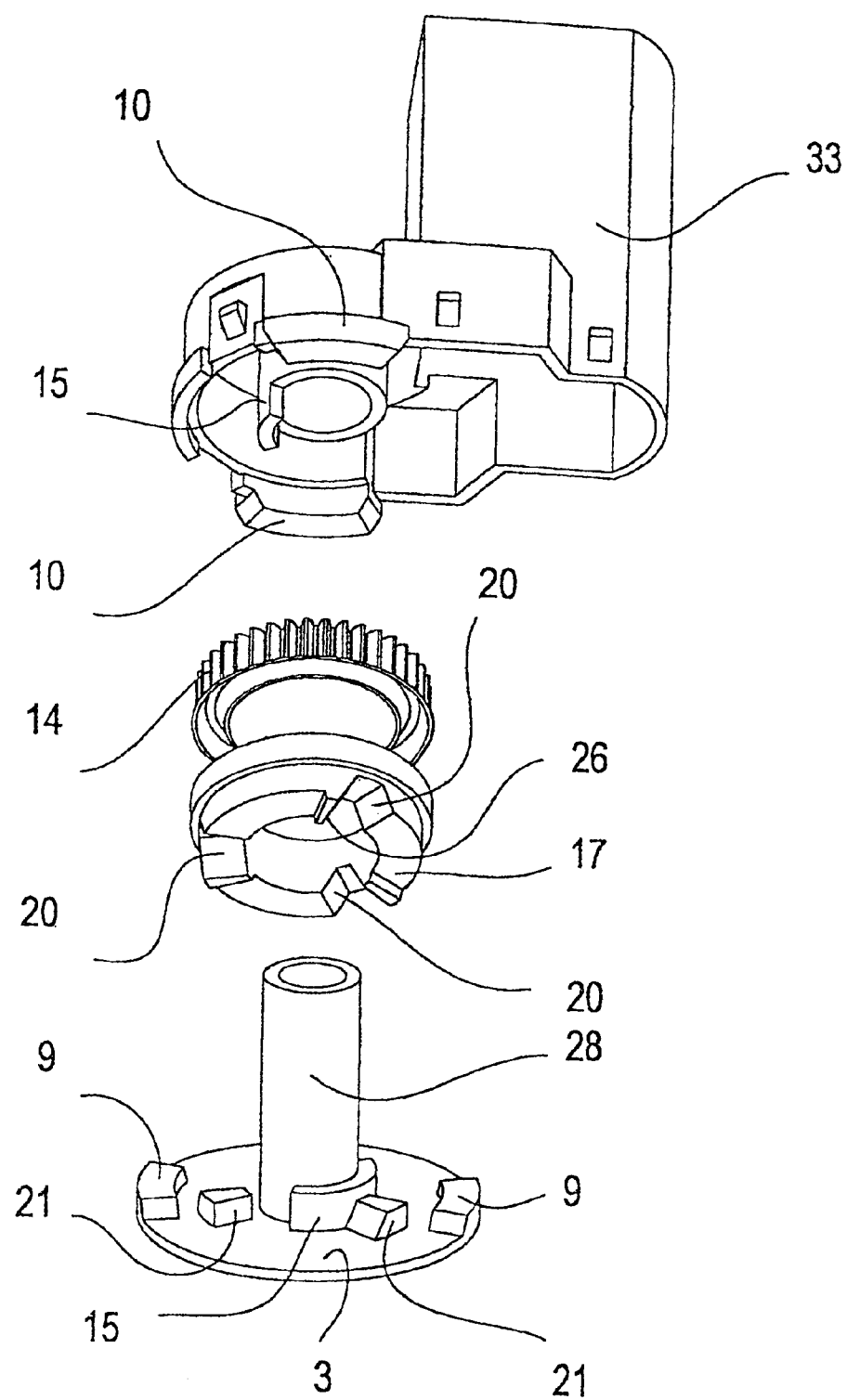
FIG. 9 shows a simplified exploded representation of the drive according to FIG. 4 (shown here without the stopper device for the sake of clarity)

FIG. 9 shows another somewhat simplified exploded representation according to FIG. 4 (shown here without the stopper device for the sake of clarity), from which the interaction of the folding path limiter 15 with the mirror head 4 and the mirror foot 3 becomes clear.

Figure 10:
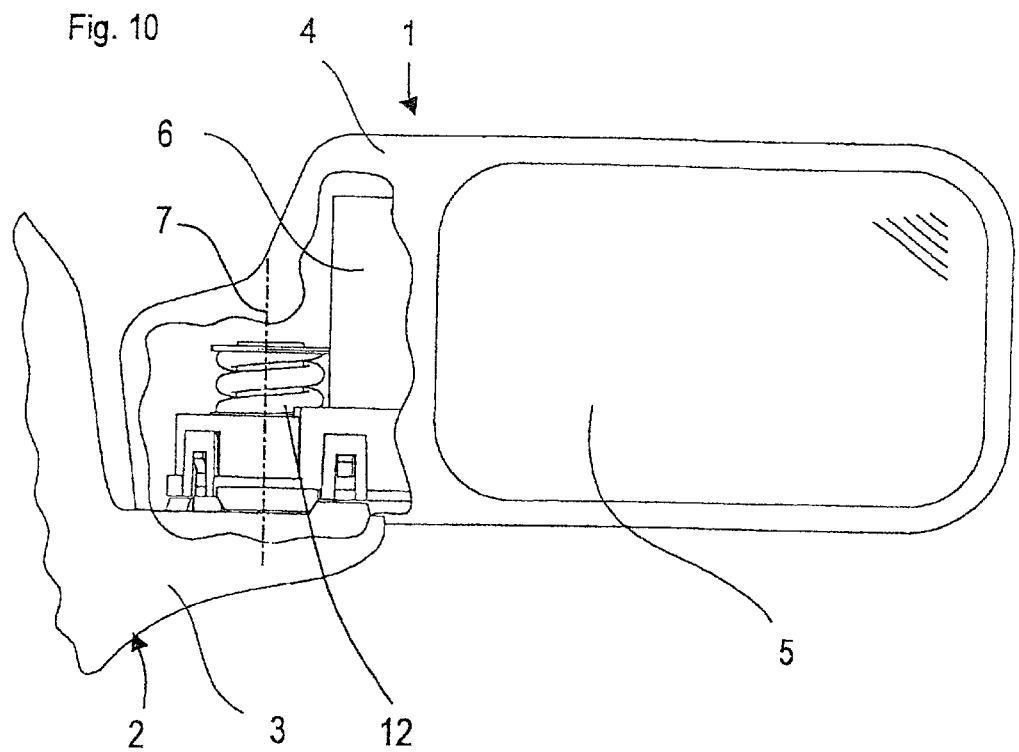
FIG. 10 shows an outside rear view mirror with a drive.

FIG. 10 shows an outside rear view mirror 1 for a motor vehicle 2 with a mirror glass 5, the mirror foot 3, whereby "mirror foot" refers to all the parts that are fixed to the body, and the drive 6.

Figure 11:
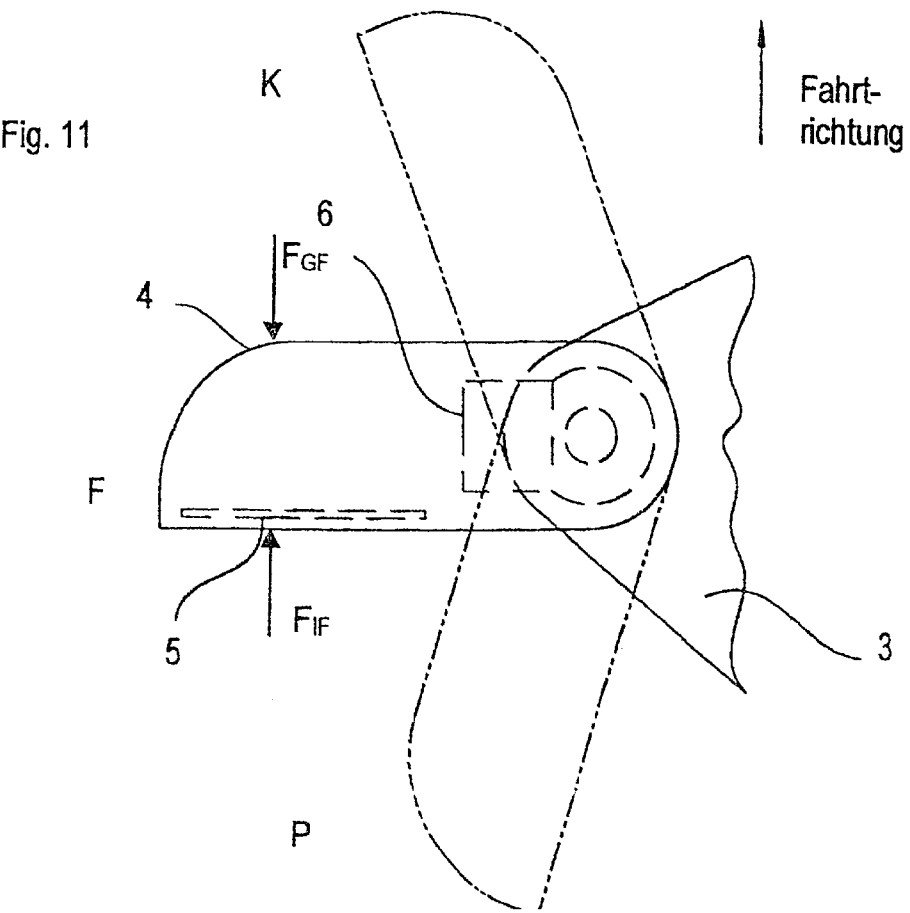
FIG. 11 shows the outside rear view mirror in three different positions.

The possible positions of the outside rear view mirror are represented in FIG. 11. In normal operation, the outside rear view mirror is displaced by the power drive only between the driving position F and the park position P. If an external blow on the rear view mirror causes a forced folding of the outside rear view mirror in the direction of travel (position K), the mirror can be returned manually or by the power drive. In this case the mirror head is raised relative to the mirror foot and the holding connection between the holding ring and the mirror foot is broken. When the mirror is returned by the power drive, a synchronization procedure is usually necessary in order to re-synchronize the holding means of the holding ring and the mirror foot. During a forced folding against the direction of travel (direction P), the mirror head 4 is not raised, because the flanks of the holding means in this direction are too steep to allow them to be overcome. To prevent the drive from being destroyed, a friction coupling is provided between the holding ring and the toothed gear whose frictional force can only be overcome by an external force. In this second possible case of forced folding, no synchronization is required. The mirror need merely be returned into the driving position. Synchronization is undesirable chiefly because the sequence of movements might be misunderstood by the driver and be interpreted as an error. If an outside rear view mirror were folded forwards in the direction of travel (K) and did not have a stopper device, the outside rear view mirror would first have to be moved into the backwards folded position as far as the folding path limiter, because the outside rear view mirror would previously encounter no resistance that would enable a movement of the holding ring relative to the mirror foot 3. The mirror head then remains in the stop position until the synchronization of the holding means has taken place and only then can the mirror head 4 be moved back into the driving position.

Figure 12:
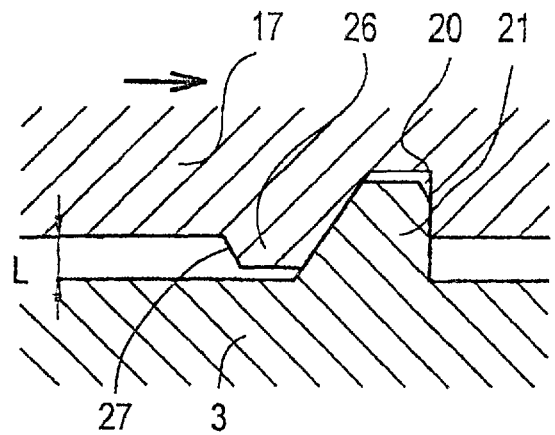
FIG. 12 shows a schematic diagram of holding means according to FIG. 4 in a first position.
Figure 12:
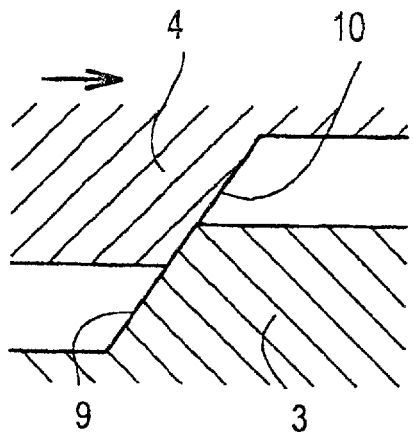
Figure 13:
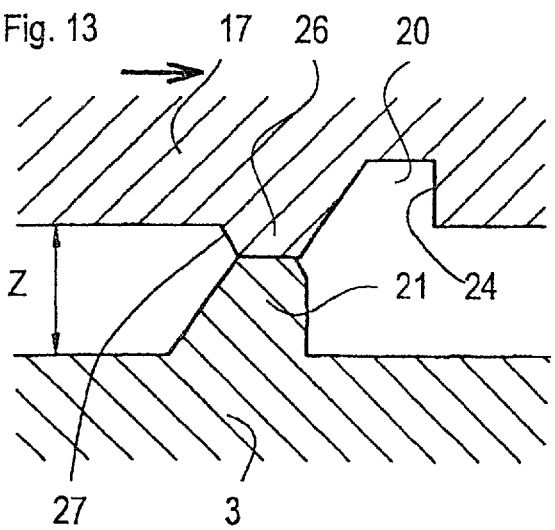
FIG. 13 shows a schematic diagram of the holding means according to FIG. 4 in a second position.
Figure 13:
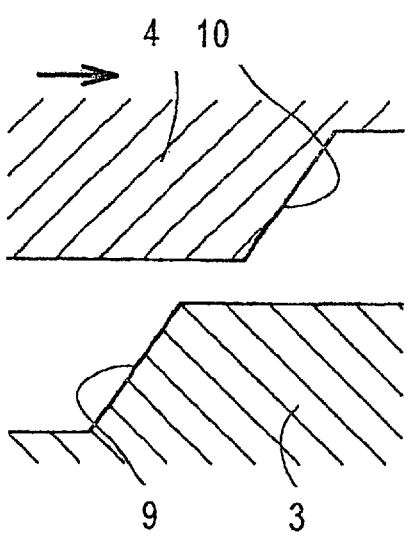
Figure 14:
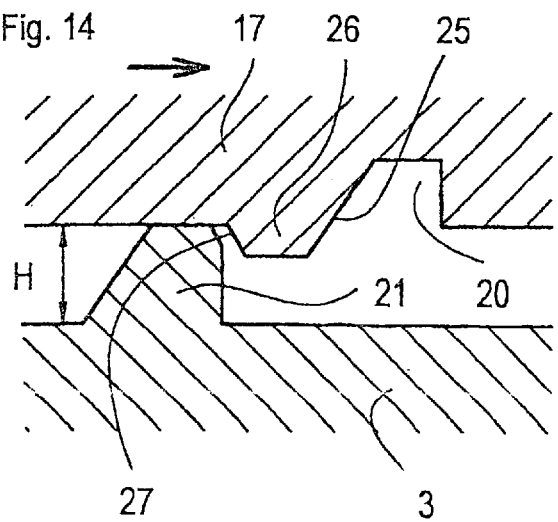
FIG. 14 shows a schematic diagram of the holding means according to FIG. 4 in a third position.
Figure 14:
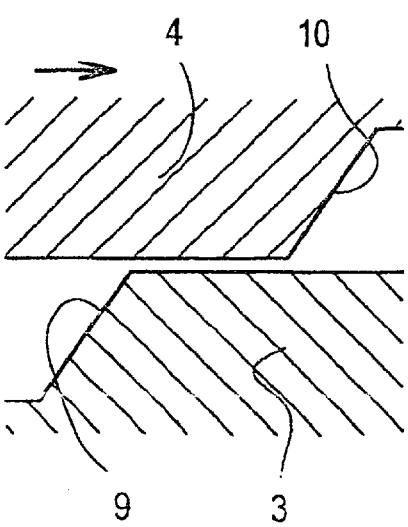

FIGS. 12, 13, and 14 show the essential possible positions of the holding ring 17 relative to the mirror foot 3 and next to them, the associated positions between the mirror foot 3 and the mirror head 4 of the outside rear view mirror according to FIG. 4. FIG. 12 shows the engaged position in which the distance between the holding ring 17 and the mirror foot 3 or between the mirror head 4 and the mirror foot 3 is smallest (L). FIG. 13 shows an intermediate position that is only attained in the forced folding movement in the direction of travel and is immediately left again. In this position the distance between the mirror foot 3 and the holding ring 17 or the mirror head 4 respectively achieves its greatest value (Z). The position occupied immediately thereafter is shown by FIG. 14. The distance between the mirror foot 3 and the holding ring 17 or the mirror head 4 respectively is in a middle range (H) between the positions (L) and (Z) hereby. During incorrect operation during which the outside rear view mirror is driven further in the direction of travel by the power drive, the projecting formation 26 prevents synchronization from taking place, because synchronization would cause the mirror head 4 to sit on the mirror foot 3 and thus cause the friction coupling to be broken. It would then no longer be possible to return the outside rear view mirror by means of the power drive. The projecting formation 26 therefore causes the drive to jam. This can be recognized electronically or by the operator and the polarity of the drive can thus be reversed. The projecting formation 26 is chamfered so that the outside rear view mirror can also be brought back into its starting position manually.

I claim:

1. Outside rear view mirror for a motor vehicle, said outside rear view mirror comprising:

a mirror foot to be fixed to the motor vehicle, a mirror head mounted on the mirror foot so that the mirror head, which carries a mirror glass, can be swivelled around a swivel axis relative to the mirror foot between a driving position and a park position by a drive, and the mirror head being fixed to the mirror foot with a swivel joint and can be folded against the motor vehicle from an operating position under a force acting externally on the mirror head, holding means between parts fixed to the mirror foot and mirror head can be disengaged in order to avoid damage to the drive, a stopper being provided on the mirror head and a counter-stopper on the mirror foot, the stopper being stopped at the counter-stopper in or adjacent to the driving position in a swivel direction when the holding means are in a disengaged state, and the stopper being movable with the counter-stopper in any swivel position between the driving position and the park position when the holding means are in the engaged state.

2. Outside rear view mirror according to claim 1, wherein the holding means are situated on the mirror foot and on a toothed gear associated with the drive.

3. Outside rear view mirror according to claim 2, wherein in the operating position, the toothed gear is connected to the mirror foot in the swivel direction via the disengagable holding means under the dynamic effect of at least one pressure spring, is mounted between the mirror head and the mirror foot, is arranged co-axially with the swivel axis, and meshes with the toothed gear of the drive.

4. Outside rear view mirror according to claim 2, wherein in the disengaged state, the toothed gear and the mirror head are raised relative to the mirror foot.

5. Outside rear view mirror according to claim 2, wherein the toothed gear is connected via at least one friction face to a holding ring provided with the holding means, and arranged co-axially with the swivel axis, whereby the holding ring is arranged between the toothed gear and the mirror foot and the holding means on the holding ring and the mirror foot are shaped so that the disengaging moment is considerably smaller when an external force acts in the direction of travel than when an external force acts against the direction of travel, and the friction moment between the toothed gear and the holding ring is greater than the disengaging moment between the holding ring and the mirror foot when an external force acts in the direction of travel, but smaller than the disengaging moment between the holding ring and the mirror foot when an external force acts against the direction of travel.

6. Outside rear view mirror according to claim 1, wherein the holding means are constructed in the form of holding cams and holding recesses whose flanks are inclined.

7. Outside rear view mirror according to claim 6, wherein the holding means are constructed in the form of holding cams and holding recesses whose flanks are inclined differently.

8. Outside rear view mirror according to claim 7, wherein the mirror head can take up a position at several height levels relative to the mirror foot, whereby at least a frictional connection between the toothed gear and a holding ring exists at all height levels and in all angles of rotation positions of the mirror head, which frictional connection is maintained by means of a pressure spring.

9. Outside rear-view mirror according to claim 8, wherein the mirror head can take up a position relative to the mirror foot at two height levels, whereby a third height level must be overcome during the transition of the mirror head from a low height level to a middle height level.

10. Outside rear view mirror according to claim 9, wherein the third height level is unattainable by the power drive either from the low height level or from the middle height level.

11. Outside rear view mirror according to claim 9, wherein the low height level is only possible between the driving position and the park position.

12. Outside rear view mirror according to claim 9, wherein the middle height level is possible only in the mirror position folded forwards in the direction of travel.

13. Outside rear view mirror according to claim 9, wherein the third height level is possible only between the driving position and a mirror position folded forwards in the direction of travel.

14. Outside rear view mirror according to claim 13, wherein the third height level is attained only briefly while an external force is acting on the mirror head in the direction of travel, and is then left, after which the middle height level is occupied.

15. Outside rear view mirror according to claim 14, wherein the transition between the middle height level and the third height level is constructed in the shape of a projecting formation.

16. Outside rear view mirror according to claim 15, wherein the formation is constructed as an inclined face relative to the swivel plane.

17. Outside rear view mirror according to claim 16, wherein the inclination of the face is selected so that the formation can not be overcome by the power drive.

18. Outside rear view mirror according to claim 16, wherein the inclination of the face is selected so that the formation can be overcome by an external force acting on the mirror head, whereby the mirror head is briefly raised to the third level against the force of the pressure spring and is then lowered to the low level.

19. Outside rear view mirror according to claim 18, wherein a friction area between the toothed gear and the holding ring is conical.

20. Outside rear view mirror according to claim 1, wherein the stopper on the mirror head lies opposite to the counter-stopper on the mirror foot in an axial direction in the driving position.

21. Outside rear view mirror according to claim 1, wherein the stopper and the counter-stopper have inclined stopper faces.

22. Outside rear view mirror according to claim 21, wherein an angle of inclination of the stopper faces corresponds to an angle of inclination of holding recesses and holding cams of the holding means.

23. Outside rear view mirror according to claim 1, wherein in the engaged state of the holding means, a smallest distance between the stopper and the counter-stopper in the axial direction is less than a maximum lift that the mirror head performs versus the mirror foot as the mirror head disengages from the mirror foot.

24. Outside rear view mirror according to claim 1, wherein in the engaged state of the holding means, a smallest distance between the stopper and the counter-stopper in the axial direction is greater than a width of the stopper in the swivel direction on a side opposite to the counter-stopper.

25. Outside rear view mirror according to claim 1, wherein in the engaged state of the holding means, a smallest distance between the stopper and the counter-stopper in the axial direction is greater than a width of the counter-stopper in the swivel direction on a side opposite to the stopper.

26. Outside rear view mirror according to claim 1, wherein the stopper and the counter-stopper are tapered.

27. Outside rear view mirror according to claim 1, wherein at least one of the stopper and the counter-stopper is provided with predetermined breaking points.

28. Outside rear view mirror according to claim 1, wherein at least one of the stopper and the counter-stopper is flexible.

29. Outside rear view mirror according to claim 1, wherein at least two stoppers and counter-stoppers are provided.

30. Outside rear view mirror according to claim 1, wherein the counter-stopper on the mirror foot is formed by a washer holding down a pressure spring, the washer is fixed to a link pipe forming part of the swivel joint so that the washer is unable to twist.

31. Outside rear view mirror according to claim 30, wherein the washer holding down the spring is constructed in the shape of a pot, whereby the counter-stopper is arranged at the edge of the pot.

32. Outside rear view mirror according to claim 1, wherein the stopper is arranged on a drive housing around the pressure spring, co-axially with the swivel axis.

33. Outside rear view mirror according to claim 1, wherein the mirror foot has stop means for limiting a swivel path and thus determining the driving or park position, and the mirror head has corresponding counter-stop means.

34. Outside rear view mirror according to claim 33, wherein at least one of at least one stop means and counter-stop means is inclined relative to the swivel direction.

35. Outside rear view mirror according to claim 1, wherein the engaged holding means can be disengaged when an external force acts on the mirror head in the direction of travel and when an external force acts on the mirror head against the direction of travel, and the mirror head can be raised thereby relative to the mirror foot.

* * * * *